UNITED STATES PATENT OFFICE.

CHARLES A. HANSEN, OF SCHENECTADY, NEW YORK, ASSIGNOR TO GENERAL ELECTRIC COMPANY, A CORPORATION OF NEW YORK.

METAL FILAMENTS.

1,075,563.      Specification of Letters Patent.      Patented Oct. 14, 1913.

No Drawing.      Application filed July 9, 1906. Serial No. 325,192.

*To all whom it may concern:*

Be it known that I, CHARLES A. HANSEN, a citizen of the United States, residing at Schenectady, county of Schenectady, State of New York, have invented certain new and useful Improvements in Metal Filaments, of which the following is a specification.

This invention relates to the production of refractory metal filaments. According to my invention the refractory metal is obtained from a reducible compound of the metal by heating that compound in a reducing chamber under low pressure and then, if desired, heating the reduction material to a high temperature, and otherwise improving the product.

I have hereinafter described my process as applied to the manufacture of tungsten filaments, but I consider that my process involves certain novel steps which are applicable to other metals than tungsten, and are particularly applicable to the treatment of compounds of the high fusing metals.

In applying my invention to practice, I produce a squirting mixture containing a reducible compound of the refractory metal, such for instance as oxid, and I reduce this oxid by heat treatment in the presence of hydrogen or other volatile reducing agent under low pressure. I consider that the pressure of the reducing agent has an important bearing on the reduction, and furthermore, has a very important bearing on the proportion of carbon left in the product, whether that carbon rises as an impurity in the oxid or comes from the binding material used when the oxid is squirted. If tunsten trioxid, $WO_3$, is used I prefer to mix with it a decomposable carbonaceous binding material, such for instance as glucose, which may be subsequently disintegrated or decomposed by heat. Glucose is, however only one of many binding materials which are suitable for this work, and I have obtained very satisfactory results with a binder containing glucose, starch, and glycerin. The glycerin prevents rapid drying of the mixture,—the starch gives it smoothness, and the glucose gives it strength for squirting. These ingredients may be used in the following proportions:—$WO_3$—39.8 parts by weight; glucose—1.2 parts; starch—1 part, and glycerin—3 parts. This mixture when squirted gives a good smooth thread which may be readily wound on a form and otherwise manipulated to produce filaments or incandescing conductors of the desired shape. The next step in my process consists in baking the raw filaments in an ordinary muffle furnace at about 150° centigrade for ten minutes; this is to dry the filaments and stiffen them. I next carbonize the filaments for ten minutes in a muffle furnace operated at approximately 300° centigrade. During this treatment the raw filaments may be mounted on a form of graphite which may be covered with pure tungsten, or they may be otherwise supported for convenient transfer in bulk from one muffle or furnace to another. I next place the graphite form with its load of carbonized filaments, in a graphite crucible and fire in a resistance furnace in an atmosphere of hydrogen at a pressure of about 20 m. m. of mercury. This heating may be conveniently carried out in the furnace shown in United States Patent No. 785,535, issued March 21, 1905, and the energy input may be maintained at about 3 kilowatts for one-half hour. I estimate that the temperature of this treatment is in the neighborhood of 1200° centigrade, and I believe that the low pressure of the hydrogen accounts for the activity of the reduction at this temperature. I prefer to bring the firing temperature up rapidly to a point above the temperature at which carbon reduces $WO_3$. I next pump out all the hydrogen from the furnace and increase the energy input to about 7 kilowatts and continue the heating operation for about one hour. I estimate that the temperature under these conditions is in the neighborhood of 2200° centigrade and I believe that no carbon remains in the filament after this last treatment, for I find that filaments which have been so treated may be run for some time at a current consumption as low as .3 of a watt per candle. I think it very possible that by working under reduced pressure, the activity of the carbon as a reducing agent is much increased and the temperature of reduction is lowered. This probably accounts for the fact that the reduction product is free from carbon and well suited for use in lamps.

Lamp filaments produced as above described may be mounted directly in the lamp, though if desired they may be first mounted on the lamp stem and then given a preliminary heat treatment in an evacuated treating chamber or in an inert gas, by passing current through the filaments to shrink them and put them in better condition for continuous operation in the lamp.

Where in the appended claims I refer specifically to the production of filaments of tungsten, I wish it to be understood that the production of filaments, or other shaped articles, of other refractory metals having similar properties is to be included thereby.

What I claim as new and desire to secure by Letters Patent of the United States, is,—

1. A squirtable mixture for the manufacture of lamp filaments consisting of an oxid of tungsten, starch, glycerin and glucose.

2. The process which consists in heating lamp filament material containing an oxid of tungsten and carbon in a reducing atmosphere at low pressure to reduce the oxid and eliminate the carbon, and in then heating to a higher temperature in an inert environment to consolidate the material.

3. The process which consists in heating threads comprising a mixture of carbonaceous material and an oxid of tungsten in a reducing atmosphere under low pressure to reduce the oxid and eliminate carbon and then heating to a higher temperature in an inert environment to consolidate the tungsten.

4. The process which consists in heating a plurality of threads comprising an oxid of tungsten and a carbonaceous binder in hydrogen at low pressure and then heating at a high temperature in a vacuum.

5. The process which consists in heating filamentary bodies comprising an oxid of tungsten and carbonaceous material in a hydrogen atmosphere at low pressure at a temperature of about 1200° C., and then heating to a temperature of about 2200° C. in a substantial vacuum.

6. The step in the production of tungsten conductors which consists in heating filamentary bodies formed from an oxid of tungsten and a carbonaceous binder in a hydrogen atmosphere at low pressure.

In witness whereof I have hereunto set my hand this 7th day of July, 1906.

CHARLES A. HANSEN.

Witnesses:
ALEX. F. MACDONALD,
BENJAMIN B. HULL.